US006719631B1

(12) United States Patent
Tulley et al.

(10) Patent No.: US 6,719,631 B1
(45) Date of Patent: Apr. 13, 2004

(54) SYSTEMS AND METHODS FOR DETERMINING A GAMING SYSTEM EVENT PARAMETER BASED ON A PLAYER-ESTABLISHED EVENT PARAMETER

(75) Inventors: Stephen C. Tulley, Stamford, CT (US); James A. Jorasch, Stamford, CT (US)

(73) Assignee: Walker Digital, LLC, Stamford, CT (US)

(*) Notice: Subject to any disclaimer, the term of this patent is extended or adjusted under 35 U.S.C. 154(b) by 0 days.

(21) Appl. No.: 09/526,834

(22) Filed: Mar. 16, 2000

(51) Int. Cl.[7] ................................................ A63F 13/00
(52) U.S. Cl. ........................................... 463/17; 463/25
(58) Field of Search ......................... 463/16–20, 25–29, 463/42; 705/14

(56) References Cited

U.S. PATENT DOCUMENTS

| | | | | |
|---|---|---|---|---|
| 4,398,708 A | | 8/1983 | Goldman et al. | 270/18 |
| 4,582,324 A | | 4/1986 | Koza et al. | 273/138 A |
| 4,842,278 A | | 6/1989 | Markowicz | 273/138 A |
| 5,085,436 A | | 2/1992 | Bennett | 273/143 R |
| 5,116,055 A | | 5/1992 | Tracy | 273/138 A |
| 5,123,649 A | | 6/1992 | Tiberio | 273/143 R |
| 5,276,312 A | | 1/1994 | McCarthy | 235/380 |
| 5,287,269 A | * | 2/1994 | Dorrough et al. | 705/14 |
| 5,297,205 A | | 3/1994 | Audebert et al. | 380/23 |
| 5,317,135 A | | 5/1994 | Finocchio | 235/375 |
| 5,327,485 A | | 7/1994 | Leaden | 379/95 |
| 5,499,816 A | | 3/1996 | Levy | 273/139 |
| 5,575,717 A | * | 11/1996 | Houriet, Jr. et al. | 463/1 |
| 5,632,681 A | * | 5/1997 | Bakoglu et al. | 463/44 |
| 5,709,603 A | | 1/1998 | Kaye | 463/17 |
| 5,787,156 A | | 7/1998 | Katz | 379/93.13 |
| 5,791,990 A | | 8/1998 | Schroeder et al. | 463/17 |
| 5,816,918 A | * | 10/1998 | Kelly et al. | 463/16 |
| 5,871,398 A | | 2/1999 | Schneier et al. | 463/16 |
| 5,885,158 A | | 3/1999 | Torango et al. | 463/27 |
| 5,959,277 A | * | 9/1999 | Lucero | 463/25 |
| 6,007,426 A | | 12/1999 | Kelly et al. | 463/16 |
| 6,016,338 A | | 1/2000 | Bansal et al. | 379/93.13 |
| 6,017,032 A | | 1/2000 | Grippo et al. | 273/138.1 |

(List continued on next page.)

FOREIGN PATENT DOCUMENTS

| | | | |
|---|---|---|---|
| DE | 19631052 | * | 2/1997 |
| DE | 196 31 052 A1 | | 2/1997 |
| EP | 0 307 925 A2 | | 3/1989 |
| EP | 0 898 253 | * | 2/1999 |
| EP | 0 898 253 A2 | | 2/1999 |
| EP | 0 907 136 A1 | | 4/1999 |
| WO | WO 98/55191 | * | 12/1998 |
| WO | WO 99/04873 | * | 2/1999 |
| WO | WO 99/26204 | | 5/1999 |

OTHER PUBLICATIONS

"Silicon Gaming Release Riddle of the Sphinx (TM); new slot game offers players dual win opportunities"; Jul. 29, 1998;Financial News, PR Newswire.

Montgomery, Christine "Casinos bet you'll gamble with with your health" Feb. 22, 1999; Accent, p. 1D The Palm Beach Post.

(List continued on next page.)

*Primary Examiner*—John M. Hotaling, II
(74) *Attorney, Agent, or Firm*—Steven M. Santisi

(57) ABSTRACT

Systems and methods are provided for operating a gaming system. In one embodiment, a player establishes at least one event parameter, such as a total wager amount, a total number of events, or an event wager amount. The total number of events may be based on, for example, a total playing time requested by the player. Each of the total number of events is associated with an event outcome to be indicated to the player, such as an event payout amount that is revealed while he or she plays the game. Based on the player-established event parameter or parameters, at least one other event parameter is determined by the gaming system.

3 Claims, 13 Drawing Sheets

U.S. PATENT DOCUMENTS

| | | | | | |
|---|---|---|---|---|---|
| 6,024,640 | A | | 2/2000 | Walker et al. | 463/17 |
| 6,033,306 | A | | 3/2000 | De Souza | 463/18 |
| 6,050,895 | A | * | 4/2000 | Luciano, Jr. et al. | 463/7 |
| 6,068,552 | A | | 5/2000 | Walker et al. | 463/21 |
| 6,077,163 | A | | 6/2000 | Walker et al. | 463/26 |
| 6,104,815 | A | * | 8/2000 | Alcorn et al. | 463/16 |
| 6,280,328 | B1 | * | 8/2001 | Holch et al. | 463/42 |
| 6,290,603 | B1 | * | 9/2001 | Luciano, Jr. | 463/25 |
| 6,568,680 | B1 | | 5/2003 | Moody et al. | 273/292 |

OTHER PUBLICATIONS

Rosenberg, Amy S. "Elvis is in the building, and ready to take your money new slot machines give players more than a chance to win" Mar. 21, 1999; News;p. P13A, The Sunday Gazette Mail.

"Riddle of the Sphinx" download date Feb. 23, 2000; http://www.silicongambing.com.

"MoneyTime, the new multi–sensory bonus slot extravaganza form Mikohn, is setting records in increased slot play" download date Mar. 24, 2000; http://www.Mikohn.com/moneytime.htrr.

"Lottery.com Wins the Jackpot With OracleMobile.com; Two Leaders Team up for the Wireless Market" Feb. 23, 2000; Business Editors, Business Wire.

Peterson, Ivars "Computer triumphs over human champion; IBM chess computer Big Blue defeats Garry Kasparov; Brief Article" May 17, 1997; No. 20, vol. 151; p. 300; ISSN: 0036–8423; Science News.

Sokolic, William H. "Gaming and Entertainment in Atlantic City" Jun. 18, 1998;Entertainment; p. 061; The New York Post.

"President Riverboat Casino first to boast over $1 Million 'Hand pay out' to slot jackpot winners" Jun. 6, 1991; Lifestyle; PR Newswire.

"Scientific Games announces new board member" Dec. 5, 1994; Business Editors; Business Wire.

PCT International Search Report for Application No. PCT/US01/08483, dated Oct. 8, 2001.

* cited by examiner

400

| GAME IDENTIFIER 402 | EVENT FORMAT NAME 404 | EVENT FORMAT DESCRIPTION 406 | EVENT DURATION TYPE 408 | AVERAGE TIME PER EVENT 410 | PAYOUT PERCENTAGE 412 | TOTAL NUMBER OF EVENTS 414 | NUMBER OF REMAINING EVENTS 416 |
|---|---|---|---|---|---|---|---|
| G 01 | TWENTY-ONE | REVEAL THE "DEALER'S CARDS" AND COMPARE... | VARIABLE | 1 / 10 SEC. | 55% | 90 | 90 |
| G 02 | AUTO RACING | REVEAL YOUR STARTING AND FINISHING POSITION... | VARIABLE | 1 / 30 SEC. | 48% | 50 | 0 |
| G 03 | SCRATCH-N-WIN | REVEAL THE ENTIRE PLAY AREA. MATCH 3 LIKE SYM... | VARIABLE | 1 / 5.5 SEC. | 52% | 400 | 218 |
| G 04 | SLOT MACHINE | PULL THE HANDLE TO SPIN THE REELS, MATCH YOUR... | FIXED | 1 / 8 SEC. | 90% | 0 | 0 |

FIG. 4

500

| PLAYER TERMINAL IDENTIFIER: PT 089 | | | | | | | | |
|---|---|---|---|---|---|---|---|---|
| GAME SESSION IDENTIFIER 502 | GAME IDENTIFIER 504 | TOTAL TIME PERIOD 506 | AVERAGE TIME PER EVENT 508 | TIME REMAINING 510 | TOTAL WAGER AMOUNT 512 | WAGER BALANCE AMOUNT 514 | CUMULATIVE PAYOUT AMOUNT 516 | SESSION STATUS 518 |
| GS 0001 | G 01 | 00:15:00 | 1 / 11.5 SEC | 00:05:00 | $15.00 | $12.84 | $6.82 | OUTSTANDING |

FIG. 5

600

| PLAYER IDENTIFIER 602 | NAME 604 | ADDRESS 606 | TERMINAL IDENTIFIER 608 | TERMINAL ADDRESS 610 | PAYMENT INFORMATION 612 |
|---|---|---|---|---|---|
| P001 | BOB WHITE | 10 MAIN STREET CENTERVILLE, NY 10001 | PT101 | 1234.5678.9012.3456 | 1111-2222-3333-4444 |
| P002 | MARY RED | 203-555-12345 | PT102 | 1000.2000.3000.4000 | 2222-1111-3333-4444 |
| P005 | SAM GREENE | SGREEENE@ADDRESS.COM | PT105 | 1212.2323.3434.4545 | CASH AT RETAILER |

FIG. 6

700

| GAME SESSION IDENTIFIER: GS 001 702 | |
|---|---|
| EVENT IDENTIFIER 704 | EVENT RESULT 706 |
| E-0001 | 0 |
| E-0002 | 0 |
| E-0003 | +5 |
| E-0004 | 0 |
| E-0005 | +1 |
| E-0006 | 0 |

FIG. 7

SYSTEMS AND METHODS FOR DETERMINING A GAMING SYSTEM EVENT PARAMETER BASED ON A PLAYER-ESTABLISHED EVENT PARAMETER

CROSS-REFERENCES TO RELATED APPLICATIONS

The present application is related to: U.S. patent application Ser. No. 09/063,590 entitled "Off-Line Remote System for Lotteries and Games of Skill" filed Apr. 21, 1998, which is a continuation of U.S. patent application Ser. No. 08/624,998 filed Mar. 29, 1996 and issued as U.S. Pat. No. 5,871,398 on Feb. 16, 1999, which is a continuation-in-part of U.S. patent application Ser. No. 08/497,080 filed Jun. 30, 1995; U.S. patent application Ser. No. 08/858,123 entitled "Off-Line Remote Lottery System" filed May 19, 1997 and issued as U.S. Pat. No. 6,024,640 on Feb. 15, 2000, which is a continuation of U.S. patent application Ser. No. 08/497,080 filed Jun. 30, 1995; U.S. patent application Ser. No. 08/880,838 entitled "Gaming Device for a Flat Rate Play Session and a Method of Operating Same" filed Jun. 23, 1997; U.S. patent application Ser. No. 09/052,291 entitled "A Gaming Device and Method of Operation Thereof" filed Mar. 31, 1998. The entire contents of these applications are incorporated by reference herein.

FIELD

The present invention relates to gaming systems. In particular, the present invention relates to systems and methods for determining a gaming system event parameter based on a player-established event parameter.

BACKGROUND

Many people enjoy the entertainment provided by various types of gaming systems. For example, many people enjoy playing "scratch-off" style instant lottery games. In this type of game, a player purchases a paper game ticket for a fixed price (e.g., each game ticket may represent a one dollar wager). The player uncovers a portion of the game ticket, such as by scratching off a coating of latex, to reveal one or more symbols (e.g., revealing three symbols each representing a potential payout amount). Based on the revealed symbols, the player is able to determine a payout amount, if any, associated with the game ticket. One reason players enjoy this type of game is the participation the game provides, such as the participation provided by uncovering portions of the game ticket. Players also enjoy the instant gratification provided by such games. That is, players do not need to wait for a nightly lottery drawing, such as a selection of winning lottery numbers, to determine if they have won. Another reason is that players can purchase a number of game tickets and play the game at their convenience.

Conventional instant lottery games, however, have a number of disadvantages. For example, it is expensive to produce the paper game tickets with appropriate symbols and latex coatings. Although different game formats may be made available to players (e.g., "win ten thousand dollars if a 'yes' is revealed when you scratch off this area" or "match three numbers on this game ticket to win that dollar amount"), only a limited number of game formats can be printed and distributed to merchants because of the cost associated with producing and distributing game tickets.

Another disadvantage associated with conventional instant lottery systems is that the level of participation that can be provided to a player is limited. For example, a player's participation may be limited to scratching off certain areas on a game ticket. In addition, the gratification that can be provided to a player is limited. For example, a player with five dollars may only be able to purchase and play five game tickets.

These limitations may reduce a player's interest in the game, resulting in fewer games being sold.

To overcome some of these disadvantages, U.S. Pat. No. 5,871,398 discloses an off-line remote lottery system which enables a player to purchase instant-type lottery game outcomes from a central computer. The player views the outcomes on a remotely located gaming computer, such as a Personal Digital Assistant (PDA).

These lottery systems would be further enhanced by an improved gaming system as described herein.

SUMMARY OF THE INVENTION

To alleviate problems inherent in the prior art, the present invention introduces systems and methods for determining a gaming system event parameter based on a player-established event parameter.

In one embodiment of the present invention, a total wager amount, a total number of events, and an event wager amount associated with each of the total number of events are determined. Each of the total number of events is associated with an event result to be indicated to a player. According to one embodiment, the total number of events is greater than one.

In another embodiment, a player-established event parameter is received from a player. The player-established event parameter may comprise: (i) a total wager amount, (ii) a total number of events, or (iii) an event wager amount associated with each of the total number of events. Based on the player-established event parameter, at least one other of (i) the total wager amount, (ii) the total number of events, and (iii) the event wager amount are determined.

Another embodiment of the present invention comprises: means for determining a total wager amount; means for determining a total number of events; and means for determining an event wager amount associated with each of the total number of events, wherein each of the total number of events is associated with an event result to be indicated to a player.

Another embodiment comprises: means for receiving from a player an indication associated with a player-established event parameter, the player-established event parameter comprising one of: (i) a total wager amount, (ii) a total number of events, and (iii) an event wager amount associated with each of the total number of events; and means for determining, based on the player-established event parameter, at least one other of: (i) the total wager amount, (ii) the total number of events, and (iii) the event wager amount.

With these and other advantages and features of the invention that will become hereinafter apparent, the nature of the invention may be more clearly understood by reference to the following detailed description of the invention, the appended claims and the several drawings attached herein.

BRIEF DESCRIPTION OF THE DRAWINGS

FIG. 4 is a tabular representation of a portion of a game database according to an embodiment of the present invention.

FIG. 5 is a tabular representation of a portion of a game session database according to an embodiment of the present invention.

FIG. 6 is a tabular representation of a portion of a player database according to an embodiment of the present invention.

FIG. 7 is a tabular representation of a portion of an event database according to an embodiment of the present invention.

DETAILED DESCRIPTION

Figure 1:
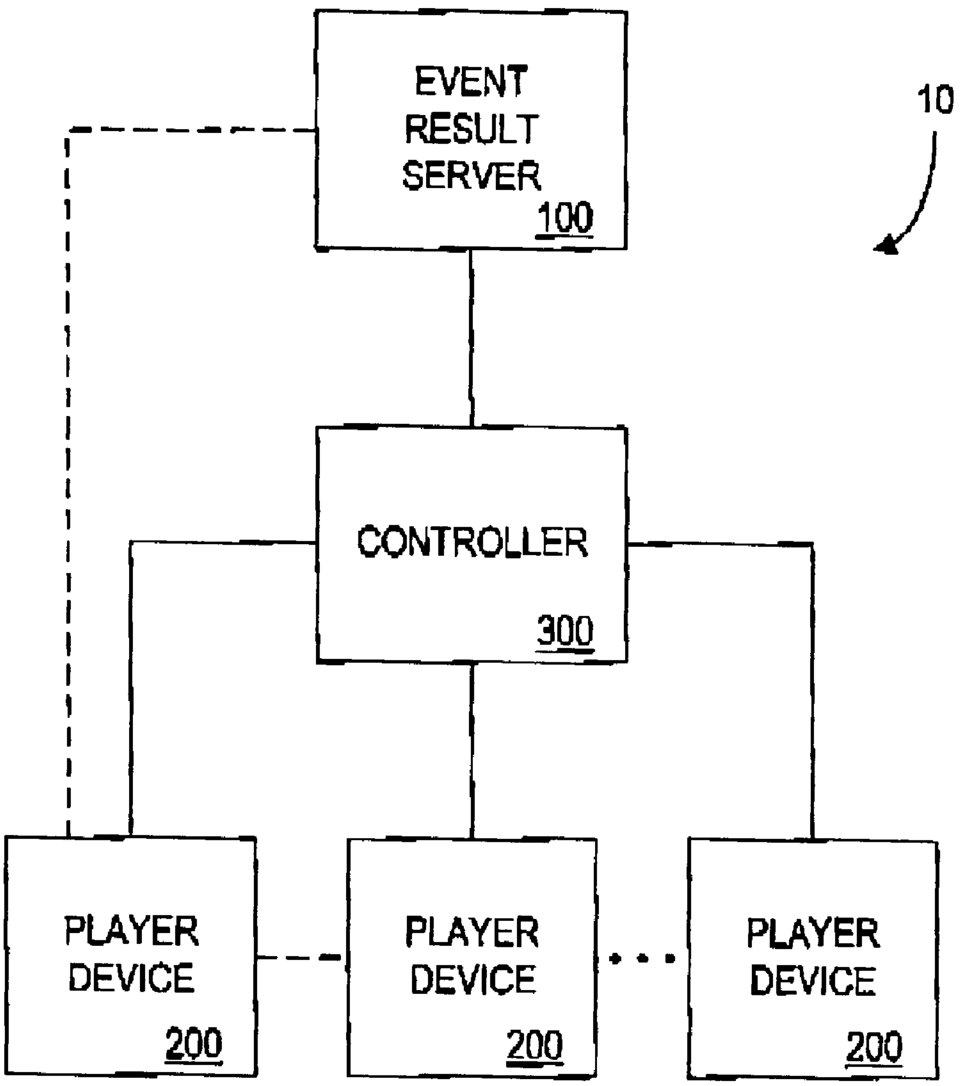
FIG. 1 is a block diagram overview of a gaming system according to an embodiment of the present invention.

The present invention is directed to systems and methods for determining a gaming system "event" parameter based on a player-established event parameter (e.g., by determining a value associated with a gaming system event parameter based on a value associated with a player-established event parameter). As used herein, an event may be any representation that is directly or indirectly indicated to a player. For example, an event may comprise an event result (e.g., "win" or "lose") that is displayed to a player. An event result may also comprise an event payout amount (e.g., "one dollar" or "five dollars") that is won by a player.

An event "parameter" is any variable associated with the play of the gaming system. For example, one event parameter is a "total number of events." That is, a player may purchase and receive a total number of events, each event being associated with an event result. Each of the event results would then be indicated to the player as he or she played the game. As one example, a game may simply comprise flipping a coin one time (e.g., a "heads" indicates that the player has won, and a "tails" indicates that the player has not won). In this case, the number of times the coin is flipped may represent the total number of events. Note, however, that each event may comprise a number of separate indications to a player. For example, a game may comprise flipping a coin three times (e.g., three "heads" indicates that the player has won, but at least one "tails" indicates that the player has not won). In this case, each set of three coin flips may represent a single event. Thus, in the case of a lottery game ticket, a single game ticket may be associated with a single event, a single game ticket may be associated with more than one event (e.g., more than one chance to win is provided with each game ticket), or a number of game tickets may be associated with a single event (e.g., the player must collect a number of game tickets to spell "W-I-N").

Another event parameter is a "total wager amount." The total wager amount may represent an amount of money that a player wagers with respect to a total number of events. For example, a player may provide a payment of twenty dollars and receive twenty lottery game tickets (e.g., associated with twenty events). An "event wager amount," representing an amount of money that a player wagers with respect to a single event, is another example of an event parameter.

Another event parameter is a "total payout amount." The total payout amount may represent an amount of money that a player wins with respect to a total number of events. For example, a player may play three slot-machine type games (i.e., associated with three events) and win a total of ten dollars. An "event payout amount," representing an amount of money a player wins with respect to a single event, is another example of an event parameter.

Another event parameter is a "payout percentage." The payout percentage may represent the average event payout amount per event wager amount. For example, if a ten dollar event wager amount will, on average, result in a five dollar event payout amount, the payout percentage would be fifty percent.

Another event parameter is a "total time period." The total time period may represent an amount of time it takes to play a game associated with a total number of events. For example, if a player plays a racing game during which an event result is displayed to the player every twenty seconds, a game session associated with six events will have a total time period of two minutes.

Another event parameter is an "event format." The event format may represent the type of game to be played by a player. For example a first event format may represent a golf game (e.g., a video game in which a player wins a prize if he or she can putt a golf ball into a hole) while a second event format may represent a card game (e.g., a video game in which a player wins a prize if he or she wins a game of blackjack).

For example, a player may use his or her PC to register with a remote Web-based game system. The player provides payment of five dollars (the total wager amount) and indicates that he or she will play a slot-machine type game (the event format) for ten minutes (the total playing time). Because each slot-machine type game takes thirty seconds to display a winning amount (the event payout amount) via an electronic slot machine (e.g., having a video representation of spinning reels), the game system determines that the player will receive twenty games (the total number of events) and each game will be associated with a bet of $0.25 (the event wager amount).

They player then uses his or her Personal Computer (PC) to play the slot-machine type game for ten minutes. Each of the twenty event results revealed to the player during that time may be associated with a winning amount (the event payout amount). For example, the player may be told that he or she has won fifty cents when three cherries are displayed on the electronic slot machine. After the player has played the electronic slot machine twenty times, he or she may have won a total of four dollars (the total payout amount).

Turning now in detail to the drawings, FIG. 1 is a block diagram overview of a gaming system 10 according to one embodiment of the present invention. As will be described, the gaming system 10 may be used to provide event results to a player. The gaming system 10 includes a controller 300 in communication with an event result server 100 and a number of player devices 200. As used herein, devices (such as the event result server 100, the player devices 200, and/or the controller 300) may communicate, for example, via a communication network, such as a Local Area Network (LAN), a Metropolitan Area Network (MAN), a Wide Area Network (WAN), a Public Switched Telephone Network (PSTN), or an Internet Protocol (IP) network such as the Internet, an intranet or an extranet. Moreover, as used herein, communications include those enabled by wired or wireless technology. Note that although a single controller 300 is shown in FIG. 1, any number of controllers 300 may be included in the gaming system 10. Similarly, any number of the other devices described herein may be included according to embodiments of the present invention.

In one embodiment of the present invention, the player device 200 communicates with a remote, Web-based controller 300 (e.g., a server) through the Internet. Although some embodiments of the present invention are described with respect to information exchanged using a Web site, according to other embodiments information can instead be exchanged, for example, via: a telephone, an Interactive Voice Response Unit (IVRU), electronic mail, a WEBTV® interface, a cable network interface, and/or a wireless communication system.

The event result server 100 may be any device capable of performing the functions described herein. For example, the event result server 100 may be a PC associated with a state lottery and configured to generate and/or transmit event results or a total payout amount.

Similarly, the controller 300 and the player devices 200 may be any device capable of performing the functions described herein. The player device 200 may be, for example: a PC, a portable computing device such as a PDA, a wired or wireless telephone, a one-way or two-way pager, a kiosk (e.g., an instant lottery kiosk located at an airport terminal), an Automated Teller Machine (ATM) device, a Point Of Sale (POS) terminal, a game terminal (e.g., a video poker terminal), a smart card, or any other appropriate storage and/or communication device.

Note that the player device 200 need not be in constant communication with the controller 300. For example, the player device 200 may only communicate with the central controller 300 via the Internet when attached to a "docking" station or "cradle" coupled to the player's PC. The player device 200 may also communicate with the controller 300 via an Infra Red (IR) port when near a kiosk located in a merchant's store.

Any of the event result server 100, the player device 200, and/or the controller 300 may be incorporated in a single device (e.g., a kiosk located in a merchant's store may act as a player device 200 and a controller 300).

According to an embodiment of the present invention, the player device 200 receives from a player an indication associated with at least one player-established event parameter. The player-established event parameter may be, for example, (i) a total wager amount, (ii) an indication associated with a total number of events (e.g., an indication associated with the total number of events or a total time period), and/or (iii) an event wager amount associated with each of the total number of events. The player may, for example, enter a value (e.g., by typing "$5.00" on a keyboard) or select a value from a set of predetermined values (e.g., by using a mouse to highlight and indicate "ten minutes" from a displayed list of "five minutes," "ten minutes," or "thirty minutes").

Based on the player-established event parameter, at least one other event parameter is determined by the gaming system 10. For example, the player device 200 or the controller 300 may calculate an event parameter based on the player-established event parameter. Consider a player who uses his or her player device 200 (e.g., his or her wireless telephone) to register with a game service (e.g., associated with the controller 300). The player indicates that he or she wishes to receive thirty dollars worth of game play (i.e., the total wager amount), and the player device 200 transmits a request to the controller 300 along with a payment identifier (e.g., a credit card number or other indication associated with a financial account). Note that the player device 200 may instead communicate directly or indirectly with the event result server 100 (as shown by a dashed line in FIG. 1). Similarly, a player device 200 may communicate directly or indirectly with another player device (e.g., to transfer wager amounts and/or event results or to play a game involving multiple players).

According to one embodiment, the controller 300 arranges for the player to provide payment of the total wager amount using the payment identifier. The controller 300 may also determine a total payout amount and/or a number of individual event payout amounts based on the total wager amount. For example, the controller 300 may initiate a random number generation process and determine that the player will win twenty-five dollars based on a thirty dollar total wager amount. According to another embodiment, the player device 200 itself generates a total payout amount and/or a number of individual event payout amounts.

According to another embodiment, the controller 300 receives a set of predetermined event results from the event result server 100. For example, the controller 300 may receive the following set of event payout amounts from the event result server 100: 0, 0, 0, +1, 0, 0, +5, 0, 0, . . . 0. Note that an event result may represent, for example, whether a player has won (e.g., whether the player has, or has not, won a new automobile), a specific dollar amount, or a percentage of an event wager amount. Also note that an event result may represent a negative amount (e.g., the player will lose five dollars as a result of this event).

The set of predetermined event results may be, for example, received by the controller 300 on a periodic or non-periodic basis (e.g., by receiving a batch of results once each week, or by receiving a batch of ten thousand event results when the controller 300 has less than one thousand event results remaining). The set may also be provided to the controller 300 in response to a player's purchase (e.g., the event result server 100 may transmit thirty event results to the controller 300 after the player has paid for thirty event results) or a player's game play (e.g., the event result server 100 may transmit an event result to the player device 200 when it is to be revealed to the player). According to still another embodiment, a set of event results is pre-stored on the player device 200 (e.g., in an encrypted format) and individual event results are "unlocked" and revealed to the player.

According to one embodiment, the controller 300 transmits a set of event results to the player device 200. According to another embodiment, either the event result server 100 or the controller 300 determines a total payout amount based on a set of event results (e.g., by calculating the total of each event payout amount). An indication associated with the total payout (e.g., twenty-five dollars) is then transmitted to the player device 200.

For example, a player may use the player device 200 to indicate that he or she wishes to pay thirty dollars (i.e., the total wager amount) and play one hundred electronic scratch-off instant lottery games (i.e., the total number of events is one hundred). In this case, the player device 200 may determine that the event wager amount is $0.30 (i.e., thirty dollars divided by one hundred). That is, each of the one hundred lottery games are associated with a $0.30 wager.

According to another embodiment, the one hundred lottery games are not associated with identical event wager amounts. For example, the player and/or the gaming system 10 may determine that the player will receive fifty event results associated with a $0.20 event wager amount and fifty event results associated a $0.40 event wager amount (still representing a thirty dollar total wager amount).

The player device 200 may also determine an event payout amount for each of the one hundred events. For example, the player device 200 may randomly allocate a twenty-five dollar total payout amount (e.g., based on an indication received from the controller 300) among the one hundred lottery games.

The player device 200 may also be used to indicate (e.g., to display, reveal, and/or transmit) each of the event results to the player. For example, the player may play a card game on the player device 200, and the result of the card game may reveal an event payout amount. The controller 300 may also arrange for the player to receive payment of, for example, an event payout amount or the total payout amount using the player's payment identifier.

Player Device

Figure 2:
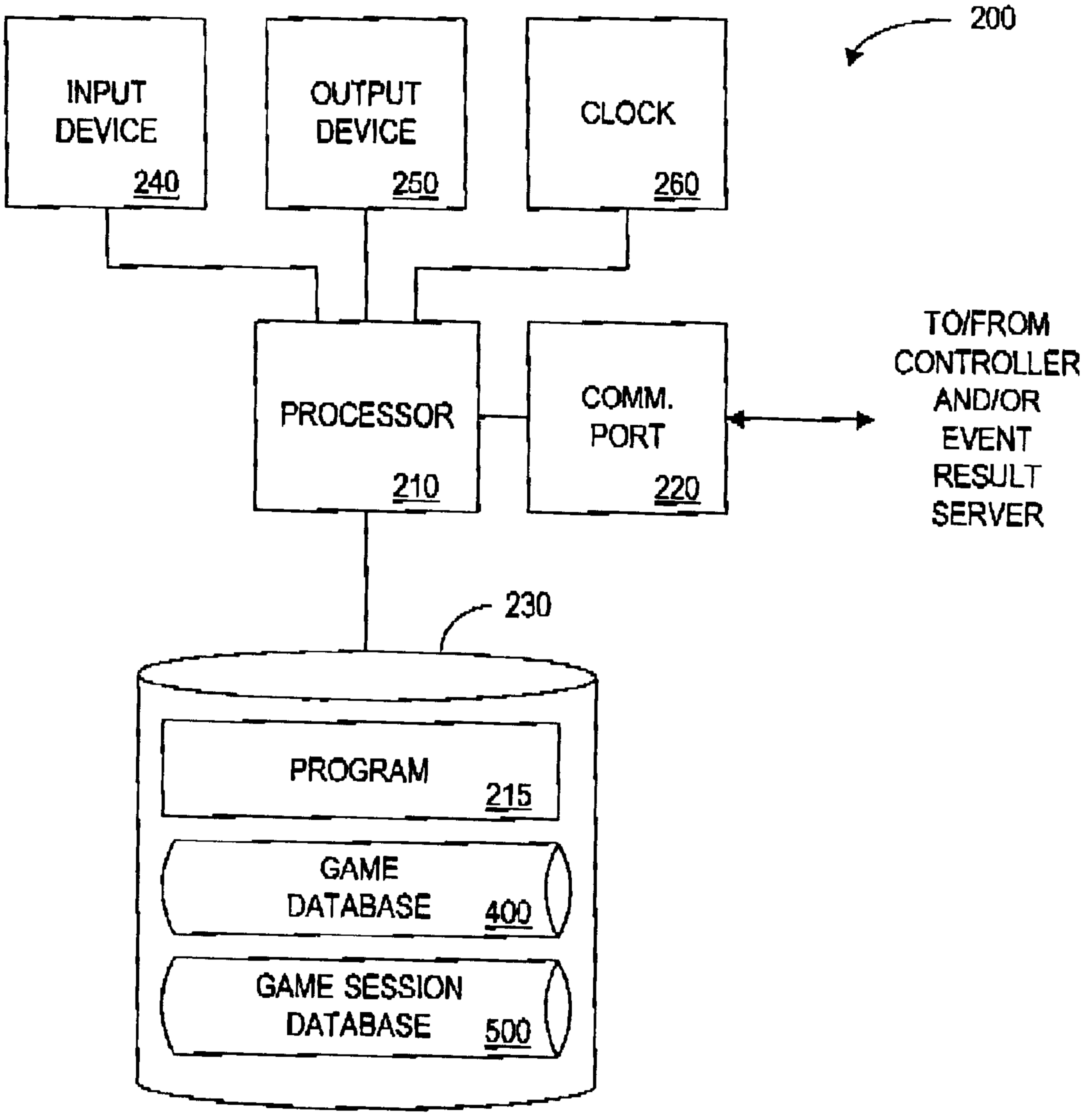
FIG. 2 is a block schematic diagram of a player device according to an embodiment of the present invention.

FIG. 2 illustrates a player device 200 that is descriptive of the device shown in FIG. 1, according to an embodiment of the present invention. The player device 200 comprises a processor 210, such as one or more INTEL® Pentium® processors, coupled to a communication port 220 configured to communicate via a communication network (not shown in FIG. 2). The communication port 220 may be used to communicate, for example, with an event result server 100 and/or a controller 300. The processor 210 also communicates with a clock device 260, such as to determine a current time or a time period.

The processor 210 is also in communication with an input device 240. The input device 240 may comprise, for example: a keyboard, a mouse or other pointing device, a microphone, a knob or a switch (including an electronic representation of a knob or a switch), and/or a touch screen. The input device 240 may be used, for example, to receive an indication associated with a player-established event parameter from a player. The input device 240 may also be used by a player to play a game (e.g., by manipulating electronically represented playing cards) during which, or after which, one or more event results are revealed.

The processor is also in communication with an output device 250. The output device 250 may comprise, for example: a display screen, a speaker, and/or a printer. The output device 250 may be used, for example, to indicate a series of event payout amounts to a player.

The processor 210 is also in communication with a storage device 230. The storage device 230 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 230 stores a program 215 for controlling the processor 210. The processor 210 performs instructions of the program 215, and thereby operates in accordance with the present invention. For example, the processor 210 may determine a total wager amount, determine a total number of events, and determine an event wager amount associated with each of the total number of events.

The program 215 may be stored in a compressed, uncompiled and/or encrypted format. The program 215 may furthermore include other program elements, such as an operating system, a database management system, and/or "device drivers" used by the processor 210 to interface with peripheral devices. Such program elements are known to those skilled in the art.

As used herein, information may be "received" by or "transmitted" to, for example: (i) the player device 200 from the event result server 100 and/or the controller 300, and/or (ii) a software application or module within the player device 200 from another software application, module, or any other source.

As shown in FIG. 2, the storage device 230 also stores a game database 400 (described with respect to FIG. 4) and a game session database 500 (described with respect to FIG. 5).

Figure 12:
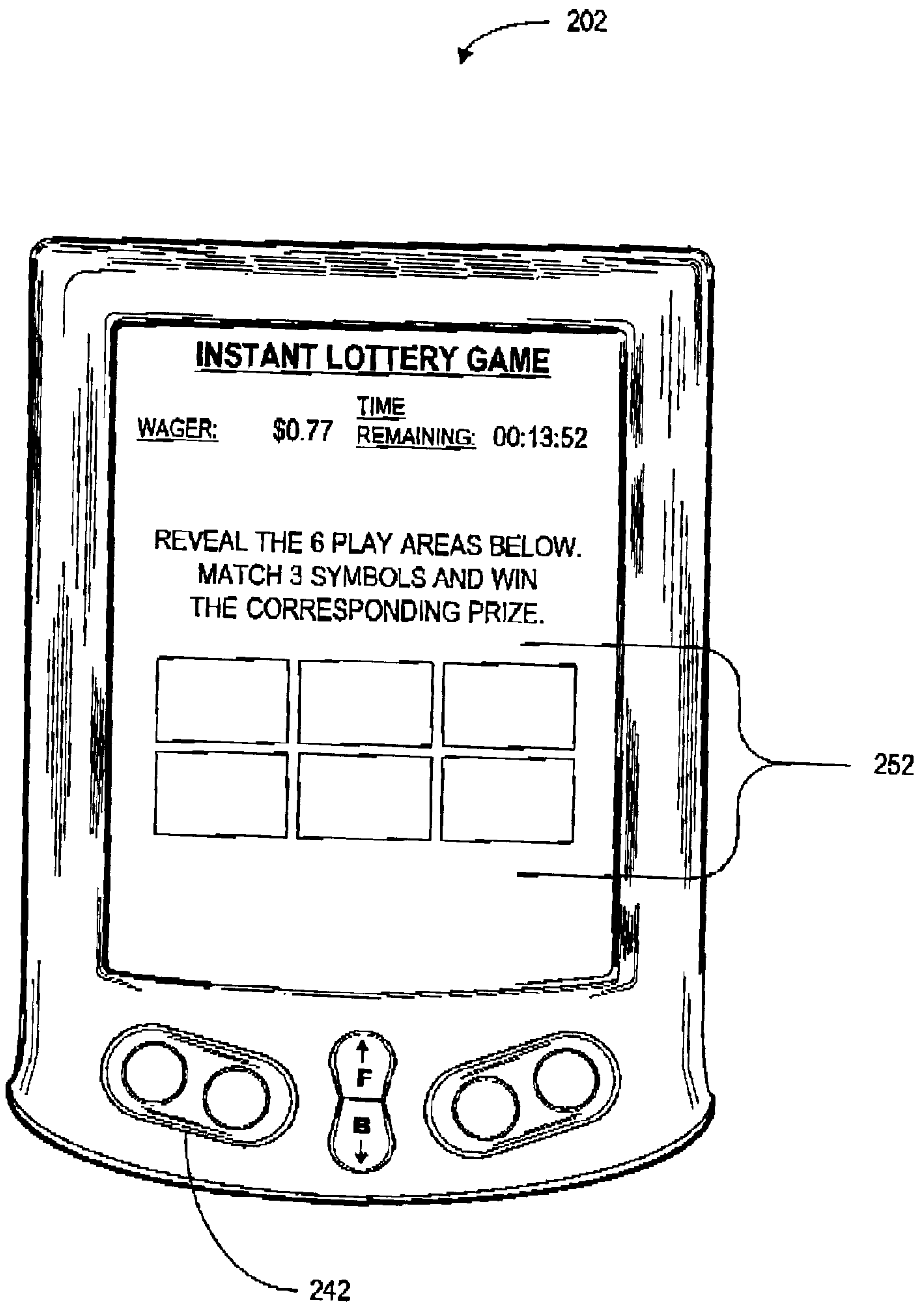
FIG. 12 illustrates a player PDA displaying information according to an embodiment of the present invention.

FIG. 12 illustrates an embodiment of the present invention wherein the player device 200 is a PDA 202. The PDA 202 includes an output device 252 (e.g., a portion of a display screen) that may be used to display one or more event results to a player. The PDA 202 also includes an input device 242 that may be used by the player to input one or more player-established event parameters (e.g., a total time period) and/or to play a game (e.g., a game during which event results are revealed).

Controller

Figure 3:
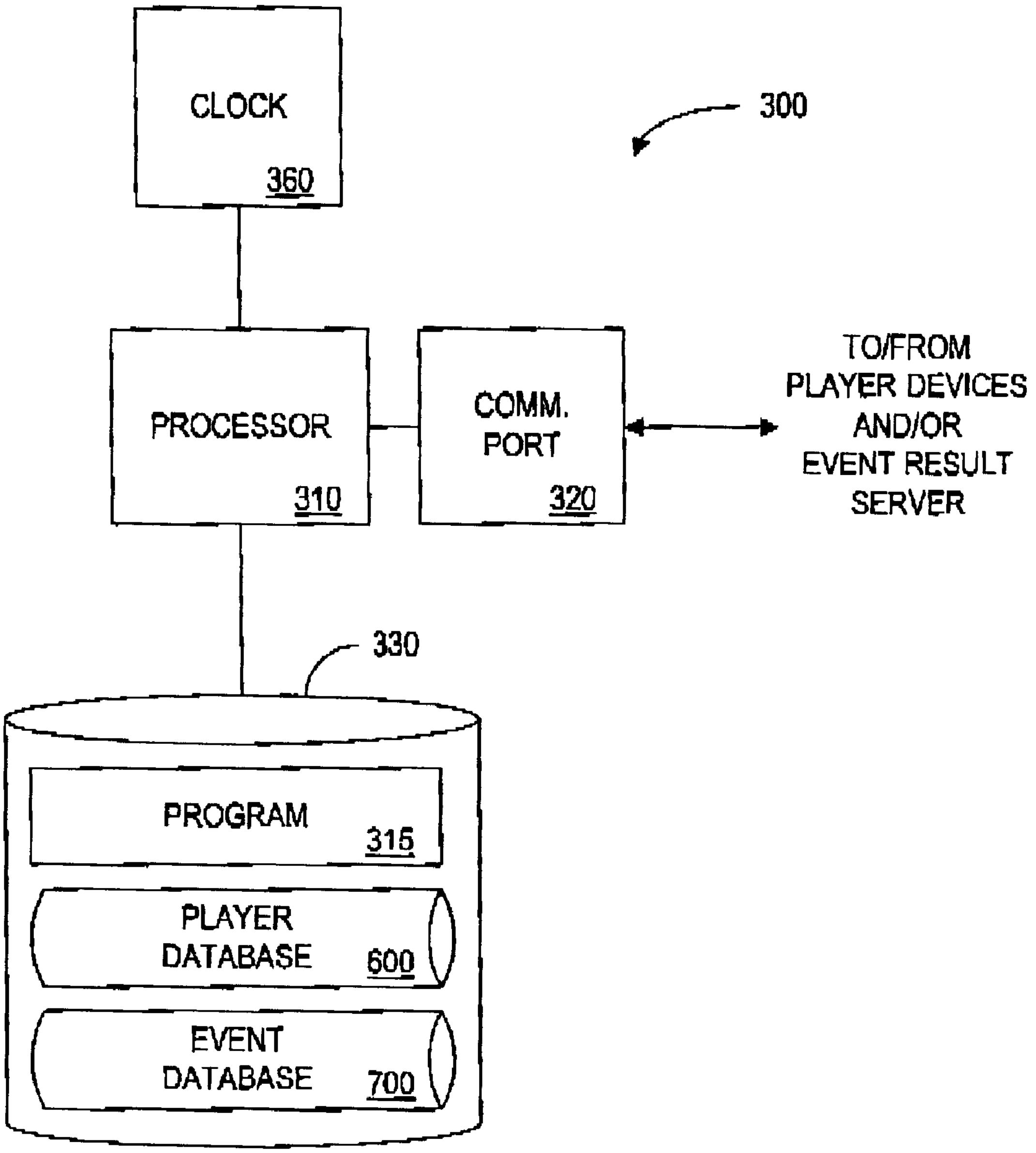
FIG. 3 is a block schematic diagram of a controller according to an embodiment of the present invention.

FIG. 3 illustrates a controller 300 that is descriptive of the device shown in FIG. 1, according to an embodiment of the present invention. Note that the event result server 100 may contain similar elements and/or perform similar functions as those described herein with respect to the controller 300.

The controller 300 comprises a processor 310, such as one or more INTEL® Pentium® processors, coupled to a communication port 320 configured to communicate via a communication network (not shown in FIG. 3). The communication port 320 may be used to communicate, for example, with an event result server 100 and/or one or more player devices 200. The processor 310 also communicates with a clock device 360, such as to determine a current time or a time period.

The processor 310 is also in communication with a storage device 330. The storage device 330 may comprise any appropriate information storage device, including combinations of magnetic storage devices (e.g., magnetic tape and hard disk drives), optical storage devices, and/or semiconductor memory devices such as RAM devices and ROM devices.

The storage device 330 stores a program 315 for controlling the processor 310. The processor 310 performs instructions of the program 215, and thereby operates in accordance with the present invention. For example, the processor 310 may determine a total wager amount, determine a total number of events, and determine an event wager amount associated with each of the total number of events.

The program 315 may be stored in a compressed, uncompiled and/or encrypted format. The program 315 may furthermore include other program elements, such as an operating system, a database management system, and/or "device drivers" used by the processor 310 to interface with peripheral devices. Such program elements are known to those skilled in the art.

As used herein, information may be "received" by or "transmitted" to, for example: (i) the controller 300 from the event result server 100 and/or one or more player devices 200, and/or (ii) a software application or module within the controller 300 from another software application, module, or any other source.

As shown in FIG. 3, the storage device 330 also stores a player database 600 (described with respect to FIG. 6) and an event database 700 (described with respect to FIG. 7).

Examples of databases that may be used in connection with the gaming system 10 will now be described in detail with respect to FIGS. 4 to 7. The schematic illustrations and accompanying descriptions of the databases presented herein are exemplary, and any number of other database arrangements could be employed besides those suggested by the figures.

Game Database

Referring to FIG. 4, a table represents the game database 400 that may be stored at a player device 200, according to an embodiment of the present invention. According to another embodiment, all or some of the information in the game database 400 may instead be stored at the controller 300. The table includes entries identifying games that can be played by a player. The table also defines fields 402, 404, 406, 408, 410, 412, 414, 416 for each of the entries. The fields specify: a game identifier 402; an event format name 404; an event format description 406; an event duration type 408; an average time per event 410; a payout percentage 412; a total number of events 414; and a number of remaining events 416. The information in the game database 400 may be created and updated, for example, based on information received from the player and/or the controller 300.

The game identifier 402 may be, for example, an alphanumeric code associated with a game that can be played by a player. For each game, the game database 400 also stores the event format name 404 and the event format description 406 that describes the game. The event format name 404 may be, for example, displayed to and/or selected by a player. The event format description 406 may comprise, for example, any text, image, and/or audio information associated with the game (e.g., information that may be provided to the player via the player device 200). According to one embodiment, the event format description 406 also includes rules, instructions, and/or parameters used by a game program or module executed by the player device 200. For example, the event format description 406 may comprise a Java applet that can be executed by the player device 200.

The event duration type 408 may indicate if the game is associated with a "variable" time period (e.g., a card game played by a player) or a "fixed" time period (e.g., a slot machine game). The average time per event 410 indicates how many event results are revealed to a player, on average, during a given time period. For example, as shown by the second entry in FIG. 4, the "auto racing" game displays one event result to a player, on average, every thirty seconds. The average time per event 410 may be based on an average associated with a number of players (e.g., a sample of players who have played the game) or with a particular player (e.g., representing how long it actually took to reveal one or more event results to that particular player). The average time per event 410 may be used, for example, to calculate the total number of events 414 based on a player-established total time period. According to another embodiment, a minimum time per event (not shown in FIG. 4) is stored in the game database 400 in addition to, or in place of, the average time per event 410.

The payout percentage 412 represents an expected return value associated with a total wager amount and/or an event wager amount. For example, a player who wagers $100 in the "auto racing" game will win, on average, $48.00. The payout percentage 412 may be used, for example, by the player device 200 to determine a total payout amount based on a player-established total wager amount.

According to another embodiment, the payout percentage 412 is used to determine the total wager amount based on a player-established total payout amount. For example, the player may indicate that he or she wants to purchase $50.00 worth of winning event results. The player device 200 may then calculate, based on a random outcome and the payout percentage 412, that the player will pay $56.00 for a set of event results that contain $50.00 worth of winning event results. In this case, the player may be required to provide payment of the total wager amount before he or she receives an indication associated with the total wager amount.

The total number of events 414 represents how many event results will be indicated to the player. The number of remaining events 416 indicates how many of the total number of events 414, which have already been purchased by the player, do not correspond to an associated event result having been revealed to the player (e.g., the player has not yet "played" those events).

Game Session Database

Referring to FIG. 5, a table represents the game session database 500 that may be stored at a player device 200 (e.g., the particular player device 200 associated with a particular player terminal identifier), according to an embodiment of the present invention. According to another embodiment, all or some of the information in the game session database 500 may instead be stored at the controller 300. The table includes entries identifying game sessions (e.g., a game session associated with a set of event results) that have been played, or are being played, by a player. The table also defines fields 502, 504, 506, 508, 510, 512, 514, 516, 518 for each of the entries. The fields specify: a game session identifier 502; a game identifier 504; a total time period 506; an average time per event 508; a time remaining 510; a total wager amount 512; a wager balance amount 514; a cumulative payout amount 516; and a session status 518. The information in the game session database 500 may be created and updated, for example, based on information received from a player and/or the controller 300.

The game session identifier 502 may be, for example, an alphanumeric code associated with a game session. The game identifier 504 may be, for example, an alphanumeric code associated with a particular game and may be based on, or associated with, the game identifier 402 stored in the game database 400.

For each game session, the game session database 500 also stores the total time period 506 associated with the game session (e.g., an amount of time that the game session will take). The time remaining 510 indicates how much more time is left in the game session, and the average time per event 508 indicates an amount of time that, on average, it has taken for a game result to be indicated to the player during the game session.

The total event wager amount 512 indicates an amount of money that the player has provided in exchange for the game session (e.g., an amount the player has wagered with respect to the total number of events). The wager balance amount 514 indicates an amount of money that the player has available (e.g., has not yet wagered). The cumulative payout amount 516 indicates the sum of the event payout amounts that have been won by the player during the game session.

That is, when all of the event payout amounts associated with the game session have been indicated to the player, the cumulative payout amount 516 will represent the total payout amount.

The session status 518 represents if, for example, a game session is "outstanding" (e.g., at least some of the event results associated with the game session have not yet been indicated to the player) or "complete" (e.g., all the event results associated with the game session have been indicated to the player). A game session may be "outstanding" when, for example, the game session is currently being played by the player or has been temporarily suspended by the player (e.g., the player has "paused" the game session).

Player Database

Referring to FIG. 6, a table represents the player database 600 that may be stored at the controller 300, according to an embodiment of the present invention. According to another embodiment, all or some of the information in the player database 600 may instead be stored at the player device 200. The table includes entries identifying players who have registered to use the gaming system 10. The table also defines fields 602, 604, 606, 608, 610, 612 for each of the entries. The fields specify: a player identifier 602; a name 604; an address 606; a terminal identifier 608; a terminal address 610; and payment information 612. The information in the player database 600 may be created and updated, for example, based on information received from the player device 200.

The player identifier 602 may be, for example, an alphanumeric code associated with a player who has registered to use the gaming system 10. The player identifier 602 may be generated by, for example, the controller 200 or the player (e.g., when the player provides a user name and password). The player database 600 also stores the name 604 and the address 606 associated with each player.

The terminal identifier 608 and the terminal address 610 may indicate, for example, a specific player device 200 associated with the player. The terminal address 610 may be, for example, an IP address that can be used to transmit information to the player device 200.

The payment information 612 may comprise, for example, a credit card, debit card or bank account number (e.g., a checking account number) or digital payment protocol information. The payment information 612 may be used, for example, by the controller 200 to arrange for the player to provide payment of the total wager amount and to receive payment of the total payout amount.

Event Database

Referring to FIG. 7, a table represents a record of the event database 700 that may be stored at the controller 300, according to an embodiment of the present invention. According to another embodiment, all or some of the information in the event database 700 may instead be stored at the player device 200 and/or the event result server 100. The information in the event database 700 may be created and updated, for example, based on information received from the event result server 100.

The table includes a record for each game session played by a player. The game session identifier 702 may be, for example, an alphanumeric code associated with a game session and may be based on, or associated with the game session identifier 502 stored in the game session database 500.

The table also defines fields 704, 706 for each event associated with the game session. The fields specify an event identifier 702 and an event result 706 associated with an event. The event result 706 may represent, for example, an event payout amount (e.g., as a dollar amount or as a percentage of the event wager amount) associated with the event.

Methods that may be used in connection with the gaming system 10 according to an embodiment of the present invention will now be described in detail with respect to FIGS. 8 through 11.

Gaming System Methods

Figure 8:
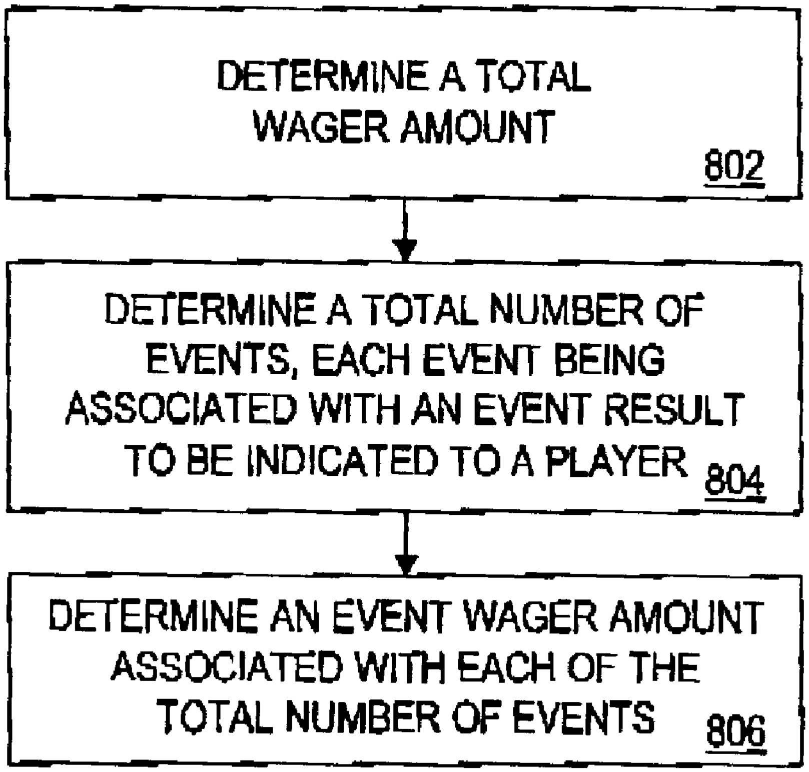
FIG. 8 is a flow chart of a method according to an embodiment of the present invention.

FIG. 8 is a flow chart of a method for operating the gaming system 10, according to an embodiment of the present invention. The method may be performed, for example, by one or more of the event result server 100, the player device 200, and/or the controller 300. The flow chart in FIG. 8, as well as the other flow charts discussed herein, does not imply a fixed order to the steps, and embodiments of the present invention can be practiced in any order that is practicable.

The method shown in FIG. 8 is used to determine a number of event parameters. In particular, at 802 a total wager amount is determined (e.g., to be stored as the total wager amount 512 in the game session database 500). At 804, a total number of events is determined (e.g., to be stored as the total number of events 414 in the game database 400), each of the total number of events being associated with an event result to be indicated to the player (e.g., as represented by the event result 706 stored in the event database 700). According to one embodiment, the total number of events is greater than one. At 806, an event wager amount associated with each of the total number of events is determined.

According to an embodiment of the present invention, at least one of the event parameters is determined based on a player-established event parameter. For example, the player may provide an indication that he or she wishes wager a total of five dollars. The player may also indicate that he or she wishes to receive two hundred events. In this case, the gaming system may, at 806, calculate that each of the event wager amounts is equal to the total wager amount divided by the total number of events (i.e., is equal to five dollars divided by two hundred, or 2.5 cents).

In general, the determinations made at 802, 804, 806 may be performed, for example, by receiving an indication associated with the event parameter from a player (e.g., the player indicates that he or she wants to receive a total of ten events), by receiving an indication associated with the event parameter from a player (e.g., the player indicates that he or she wants to play a particular type of game for twenty minutes, and that particular type of game reveals three event results per minute), or by retrieving a stored value (e.g., a roulette-wheel type game is always associated with a ten dollar total wager amount).

One or more of the determinations made at 802, 804, 806 may instead comprise calculating the event parameter, such as by calculating the event parameter based on at least one player-established event parameter.

For example, the determination of the total wager amount at 802 may comprise calculating the total wager amount based on the event wager amount and the total number of events. According to one embodiment, the total wager amount may be calculated, for example, by multiplying the event wager amount and the total number of events. The total wager amount may also be calculated by multiplying an average event wager amount and the total number of events. For example, a player may purchase one hundred events having an average event wager amount of $0.50. In this case, the player device 200 may determine that the total wager amount is fifty dollars. The player would then receive one hundred events having various event wager amounts, the average event wager amount being $0.50. According to another embodiment, the total wager amount is further based on a random outcome. For example, a player may have a predetermined bonus amount (or bonus percentage) added to his or her total wager amount based on a random outcome.

The determination of the total number of events at 804 may comprise calculating the total number of events based on the event wager amount and the total wager amount. According to one embodiment, the total number of events is calculated by dividing the total wager amount by the event wager amount. Consider, for example, a player who has an wager balance amount 514 of $12.84 (i.e., the player has $12.84 worth of value stored on his or her player device 200). If the player requests that "all of the remaining funds" be used to purchase events associated with a one dollar event wager amount, the gaming system 10 may provide the player with a total of thirteen events (e.g., twelve events associated with one dollar event wager amounts and one event associated with an $0.84 event wager amount).

According to another embodiment of the present invention, the total number of events is calculated based on a total time period. For example, a player may indicate that he or she wishes to play an electronic golf game (e.g., a game that uses a combination of skill and a random event result to determine an event payout amount) for a total of two hours. If the minimum time period associated with a question and answer in the golf game (e.g., the minimum amount of time required to reveal a single event result to the player) is thirty seconds, a maximum of two hundred and forty event results could be indicated to the player during the two hour game session (e.g., the total number of events provided to the player will be two hundred and forty). If the player had selected an event format of "mystery story," requiring a minimum of four minutes to reveal a single event result, the total number of events would have been thirty.

Instead of calculating the total number of events based on a minimum time period (e.g., based on the maximum number of event results that could be revealed during the total time period), the total number of events may be calculated based on an average time period (e.g., based on the average number of event results that will be revealed during the total time period). The average time period may be based on, for example, the average time period associated with all players who have played that type of game or an actual amount of time associated with revealing one or more event results to that particular player (e.g., during a prior game session).

According to one embodiment, the total number of events is further based on a random outcome. For example, a player may receive a predetermined number of bonus events based on a random outcome.

The total number of events may also be based on, for example, a total payout amount and/or an event payout amount. Consider a player who has selected an event format that only provides three different event payout amounts: $0.00, $1.00 and $5.00 (i.e., an event payout amount cannot have another value such as $3.00). Assume also that the player purchases two tickets (or any other type of event), and the player device 200 determines that the total payout amount to be revealed to the player is nine dollars (e.g., based on a signal received from the controller 300). In this case, the player device 200 may inform the player that he or she will instead receive five tickets (i.e., four tickets each having a $1.00 event result and one ticket having a $5.00 event result). The total number of events can also be based on a predetermined formula or table similar to those described with respect to 806. For example, a stored table may indicate that a total of five events are provided if the total wager amount is less than ten dollars, a total of ten events are provided if the total wager amount is at least ten dollars but less than one hundred dollars, and a total of twenty events are provided if the total wager amount is at least one hundred dollars.

In addition to determining the total number of events at 804, the total number of events may be allocated or distributed by the gaming system 10. For example, the total number of events may be allocated over time (e.g., such that the player receives one event per hour, or receives events according to a random, non-periodic schedule). The total number of events may also be allocated over a representation of space (e.g., over actual space or a representation of a virtual space). For example, events may be scattered over a geographic region (e.g., along a highway route, within a vacation resort, or at certain stores within a shopping mall). In this case, the player device 200 may use, for example, a Global Positioning System (GPS) device or a transmitter/receiver device to determine the player's actual location. The events may instead be allocated, for example, along an imaginary race-track for the player to discover as he or she negotiates a race car simulation via the player device 200.

The determination of the event wager amount at 806 may comprise calculating the event wager amount based on the total wager amount and the total number of events. For example, each event may be associated with an equal event wager amount. In this case, the event wager amount may be based on the total wager amount divided by the total number of events.

According to another embodiment, different events may be associated with different event wager amounts. In this case, the total wager amount may be allocated among the total number of events in any of a number of different ways. For example, a predetermined formula or event wager amount table may indicate that the size of the event wager amounts should increase during play (e.g., to increase the player's level of interest). The size of the event wager amounts may increase, for example, in a linear or exponential fashion. The size of the event wager amounts may instead change in steps (e.g., the first seventy percent are nickel wagers, the next twenty percent are dime wagers, and the last ten percent are quarter wagers) or actually decrease in value. Other event wager amount formulas, such as a formula based on a desired standard deviation associated with the event wager amounts, can also be used.

According to another embodiment, the allocation of the total wager amount among the total number of events is also based on a player allocation parameter. For example, a player may indicate that he or she prefers to have a few "jumbo" event wager amounts allocated among the total number of events, or that all event wager amounts should be within twenty percent of an average event wager amount.

According to one embodiment of the present invention, the gaming system 10 may also determine a modified event parameter. For example, a player may have received one hundred lottery ticket events in exchange for a twenty dollar total wager amount. In this case, the player device 200 may have calculated that the event wager amount was $0.20 (i.e., the total wager amount divided by the total number of events). After playing fifty lottery tickets on his or her player device 200, however, the player may request that the number of remaining lottery tickets (i.e., the fifty remaining tickets) be increased to one hundred. In this case, the player device 200 may modify the event wager amount to $0.10 (based on the modified total number of events and the remaining total wager amount of ten dollars). A modified total wager amount and/or a modified total number of events can likewise be determined.

Figure 9A:
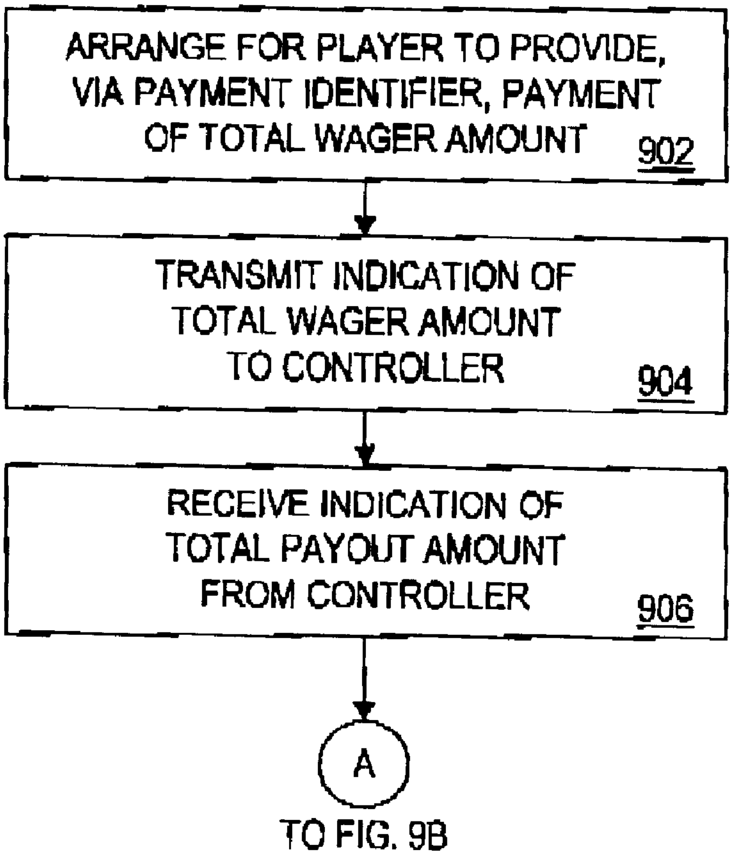
FIGS. 9A and 9B are a flow chart of a method that may be performed by a lottery device according to another embodiment of the present invention.
Figure 9B:
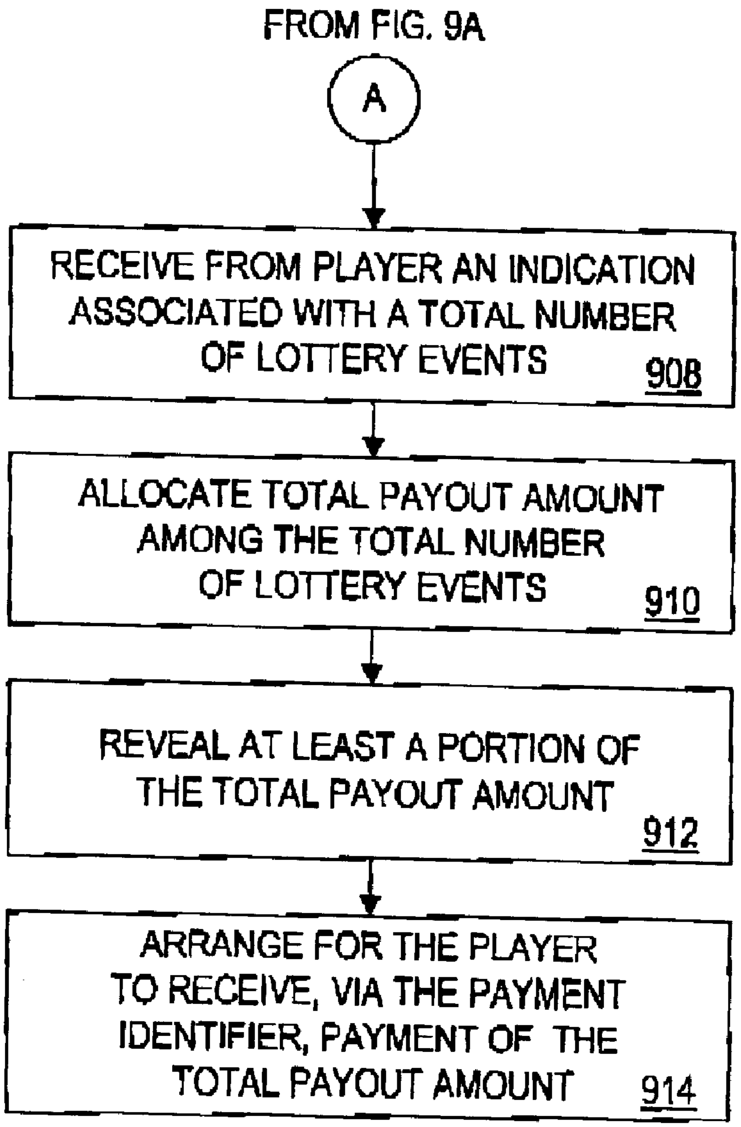

FIGS. 9A and 9B are a flow chart of a method that may be performed by a lottery device according to another embodiment of the present invention. The method may be performed, for example, by the player device 200.

At 902, it is arranged for a player to provide, via a payment identifier, payment of a total wager amount. At 904, an indication associated with the total wager amount is transmitted to the controller 300. At 906, an indication associated with a total payout amount is received from the controller 300.

For example, a player may enter his or credit card number at a lottery kiosk located at a merchant's store. The kiosk may then use the credit card number to receive payment of a total wager amount (as selected by the player from a list of possible total wager amounts) and transmit an indication associated with a total payout amount to the player's PDA lottery device. The indication associated with the total payout amount may be encoded or encrypted such that the player cannot readily determine if the total payout amount is more than his or her wager amount. In this case, the player may allowed to "return" any unused lottery events (e.g., by returning to the kiosk). According to one embodiment, a player may can "subscribe" to such a lottery service. In this case, the payment identifier can be stored at the controller 300 and used to periodically receive payment from the player.

According to another embodiment, the player uses his or her PC as a lottery device and communicates with the controller 300 via a lottery Web site. In this case, various player preferences (e.g., favorite event formats and/or event parameters) and/or the payment identifier may be stored as a "cookie," or block of data that a Web server (e.g., the controller 300) stores on a client system (e.g., the player's PC). When the player returns to the lottery Web site, or an associated Web site, the browser of the player's PC sends a copy of the cookie back to the Web server. Cookies may be used to identify players associated with a player device 200, to instruct the Web server to send a customized version of a Web page, and for other purposes.

At 908, an indication associated with a total number of lottery events is received from the player (e.g., via the input device 240). For example, the player may indicate that he or she wants to play one hundred lottery tickets, or to play a particular type of lottery game for a total of eight minutes (e.g., one minute every hour from 9:00 AM to 5:00 PM). According to one embodiment, the player may also specify a delivery method associated with a game session. For example, a player may request that event results be delivered to a particular electronic mail address.

At 910, the total payout amount is allocated among the total number of lottery events. For example, the lottery device may determine an event wager amount associated with each lottery event (e.g., based on the total wager amount and the total number of lottery events). In this case, the total payout amount may be allocated based on the event wager amounts. Suppose that the event wager amount is one dollar and a particular event format is only associated with two event payout amounts: (i) 0% of the event wager amount; and (ii) 100% of the event wager amount. In this case, a total payout amount of five dollars may be allocated among thirty lottery events by randomly selecting five of the thirty events to be "winning" events.

According to another embodiment, the lottery device randomly allocates the total payout amount among the total number of events based further on a player allocation parameter. For example, a player may indicate that he or she prefers to win many small event payout amounts (or a few large event payout amounts). Similarly, the event payout amounts may be allocated based on an order of the event payout amounts (small event payout amounts are to be indicated to the player first), a predetermined formula (e.g., based on a standard deviation associated with the event payout amounts), and an event payout amount table.

The allocation of the total payout amount may be performed by, for example, the player device 200, the controller 300, and/or the event result server 100. According to another embodiment, each event payout amount may be retrieved from a set of predetermined event payout amounts stored by any one or more of those devices. Note that instead of allocating a total payout amount, the player device 200 may randomly generate an event result associated with each event (e.g., using a random number generation process).

At 912, at least a portion of the total payout amount is revealed to the player (e.g., is displayed via the output device 250). At 914, it is arranged for the player to receive, via the payment identifier, payment of the total payout amount.

According to another embodiment, the player device 200 may instead provide a payout redemption code to the player. In this case, the player can bring the payout redemption code to a merchant or an ATM device to receive payment of his or her total payout amount. The payout redemption code may be, for example, a verifiable "hash" value generated when player and event information are used with a hash function, such as a one-way hash function. A hash function is a transformation that takes input information and returns a hash value. In general, one can think of a hash value as a "digital fingerprint" of the input information. For example, the input information to the hash function may be the player's name and address and information about a set of events (e.g., a series of event results). In this case, the hash function would generate the payout redemption code based on the input information. The controller 300 could then validate the payout redemption code using an associated function. Applicable hash functions and other encryption techniques are described in Bruce Schneier, "Applied Cryptography: Protocols, Algorithms, and Source Code in C" (John Wiley & Sons, Inc., 2nd Ed. 1996). Note that the payout redemption code may, for example, be provided to the player in a human-recognizable format or may be stored on the player device 200.

Figure 10:
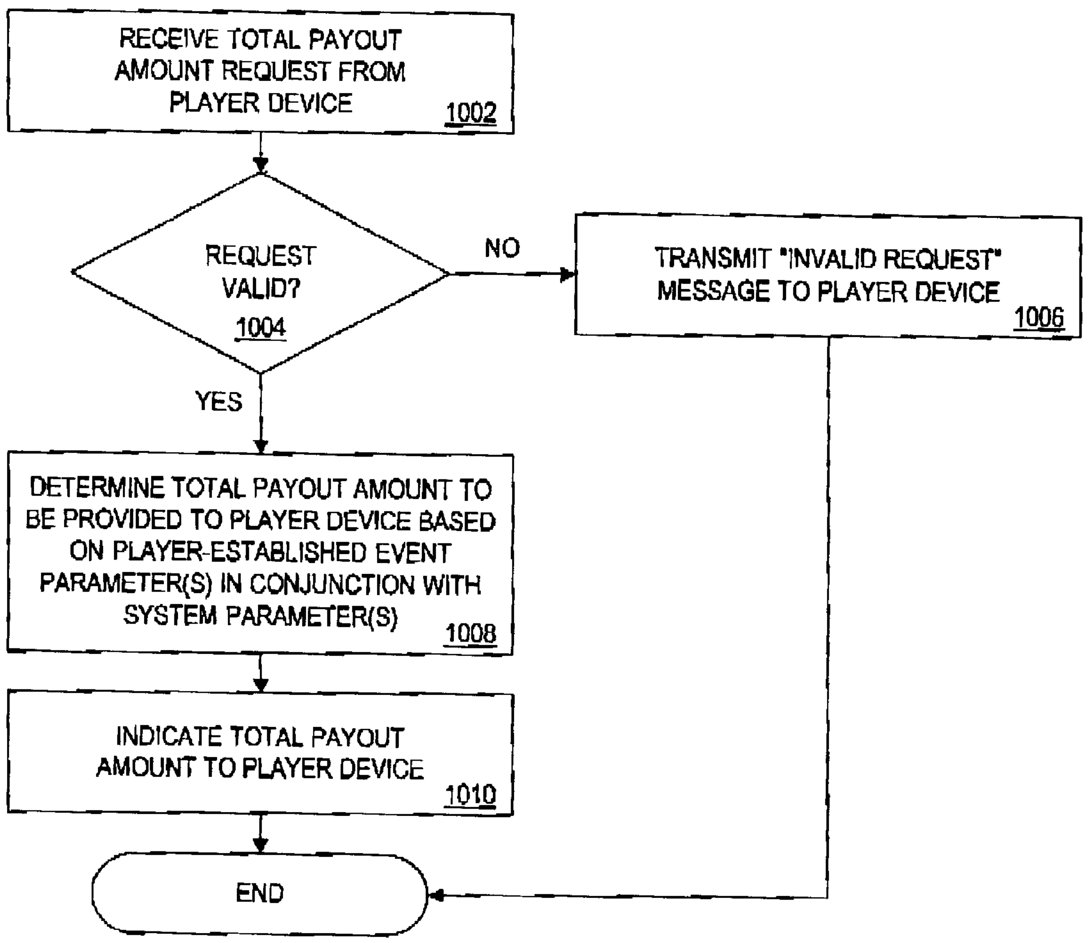
FIG. 10 is a flow chart of a method that may be performed by a controller according to an embodiment of the present invention.

FIG. 10 is a flow chart of a method that may be performed by the controller 300 according to an embodiment of the present invention. At 1002, a total payout amount request is received from the player device 300. The total payout amount request may include, for example, payment information 612, a player identifier 602, a terminal identifier 608, and/or one or more player-established parameters (e.g., an event wager amount and an event format name 404).

At 1004, the controller 300 determines if the request is valid. This may comprise, for example, validating the payment information 612 (e.g., via a credit card authorization device). If the request is not valid, an "invalid request" message is transmitted to the player device 200 at 1006.

At 1008, the total payout amount is determined based on the player-established event parameters. According to one embodiment, the controller 300 accesses a set of predetermined event results and calculates the total payout amount. According to another embodiment, the controller 300 uses a random outcome to determine the total payout amount. For example, a particular event format (e.g., slot-machine type games) may be associated with a particular payout percentage 412. According to another embodiment, the payout percentage 412 is adjusted based on a total number of events being purchased and/or event wager amounts (e.g., the payout percentage 412 may be increased when the player buys a large number of high-wager events). At 1010, the controller 300 provides an indication associated with the determined total payout amount to the player device 200.

Figure 11:
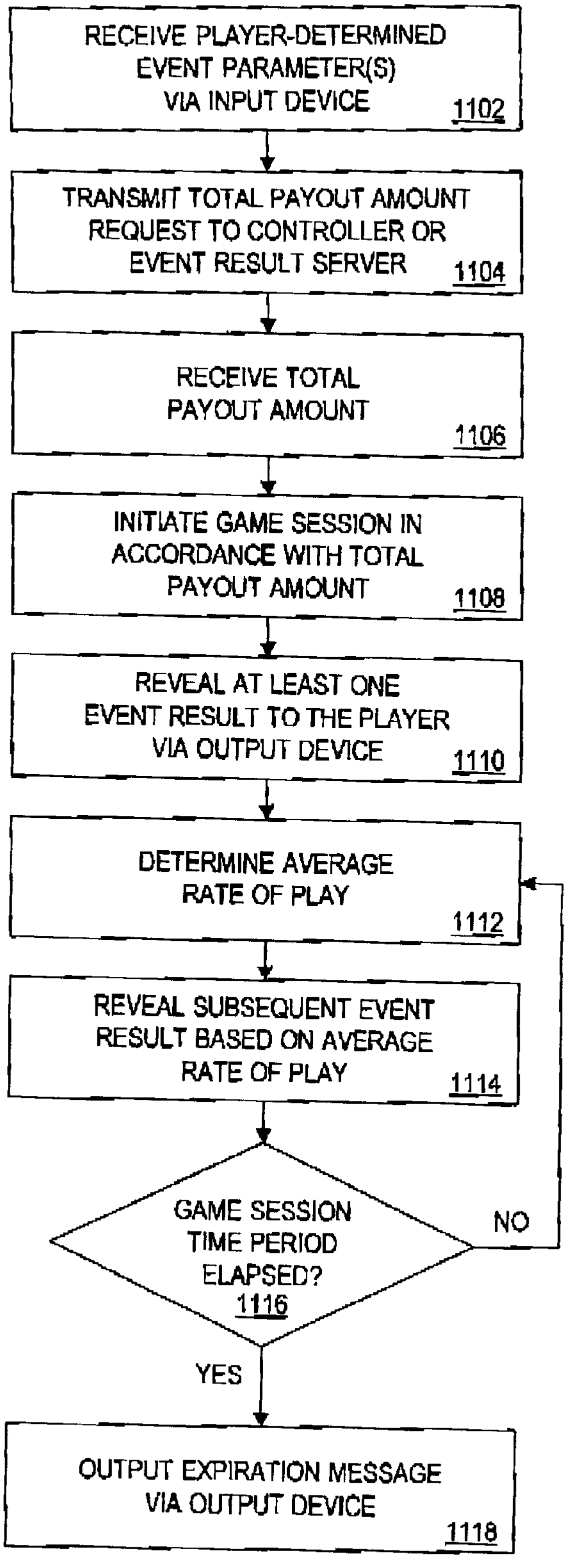
FIG. 11 is a flow chart of another method that may be performed by a player device according to an embodiment of the present invention.

FIG. 11 is a flow chart of another method that may be performed by the player device 200 according to an embodiment of the present invention. At 1102, one or more player-established event parameters are received via the input device 240. For example, the player may use a touch screen to select a total time period of ten minutes for a gaming session.

At 1104, a total payout amount request is transmitted to the controller 300, and an indication the total payout amount is received from the controller at 1106. For example, the controller 300 may transmit an indication that the player will win thirty-five dollars during the ten minute gaming session.

At 1108, a game session is initiated in accordance with the total payout amount. Consider, for example, a player who provides a total wager amount of ten dollars to play a racing game for ten minutes. Also assume that the racing game typically (e.g., on average) reveals one event result per minute to players. In this case, the player device 200 may calculate that the player will likely receive a total of ten event results during his or her ten minute session. The player device 200 may then allocate the thirty-five dollar total payout amount among the ten event results by assigning the following event payout amounts (in dollars): 0, 0, 20, 0, 0, 5, 0, 0, 10, 0.

At 1110, the player device 200 begins to indicate event results (e.g., event payout amounts) to the player via the output device 250 as he or she plays the driving game. For example, the player device 200 may reveal the first five event results (i.e., 0, 0, 20, 0, 0) to the player.

At 1112, the player device 200 determines an average rate of play. This may be performed, for example, when the event duration type 408 indicates that an event format is associated with a "variable" average time per event 410. Thus, if it has taken eight minutes for a particular player to reveal five event results, the player device 200 may determine that his or her average rate of play is 0.625 event results per minute. At 1114, a subsequent event result is revealed to the player based on the average rate of play. Consider, for example, a player who (i) has five event results that have not been revealed, the five event results representing fifteen dollars worth of event payout amounts, (ii) has only one minute remaining of his or her total playing time, and (iii) has been averaging 0.625 event results per minute. In this case, the player device 200 may re-allocate the remaining fifteen dollars worth of event payout amounts into a single event result. In this way, when the game session time period is determined to be elapsed at 1116, the entire total payout amount will have been revealed/provided to the player.

At 1118, an expiration message, such as a message indicating the total payout amount or a "game over" message, is output to the player via the output device 250.

Additional Embodiments

The following are several examples which illustrate various embodiments of the present invention. These examples do not constitute a definition of all possible embodiments, and those skilled in the art will understand that the present invention is applicable to many other embodiments. Further, although the following examples are briefly described for clarity, those skilled in the art will understand how to make any changes, if necessary, to the above-described apparatus and methods to accommodate these and other embodiments and applications.

According to one embodiment, other event parameters may be determined by the player and/or the gaming system 10. For example, the size of largest potential event payout amount (e.g., the size of the largest "jackpot" available in a game) may be used as an event parameter.

According to another embodiment, the payout percentage 412 may be considered an event parameter to be determined by the player and/or the gaming system 10. For example, the player may select a payout percentage 412, in which case the gaming system 10 may modify the total number of events being purchased by the player.

According to another embodiment, the calculation of event parameters by the gaming system 10 is also based on information about the player. The information about the player may include, for example: a location, a player status (e.g., indicating if the player has recently registered with the controller 300 or has previously purchased a large number of events via the controller 300), and/or demographic information.

According to other embodiments, the calculation of event parameters by the gaming system 10 may also be based on, for example: a time of day, a time of year, and/or revenue management information (supply and/or demand information associated with the gaming system 10 or with a particular kiosk).

According to one embodiment, event parameters are dynamically calculated and displayed to the player. For example, as the player adjusts a graphical representation of a sliding scale labeled "event wager amount variation," a display indicating a minimum wager amount and a maximum wager amount may be updated and displayed to the player at each end of the scale. According to another embodiment, a player may select a pre-determined parameter package from a group of packages (e.g., associated with a set of event parameters). According to another embodiment, the gaming system 10 may suggest a particular package, or a modification to one or more event parameters, to the player.

According to one embodiment, the gaming system 10 may automatically modify one or more event parameters. For example, a player may chose to have his or her winnings be automatically "re-invested" as additional playing time.

According to another embodiment, a wager amount may represent something other than a monetary amount. For example, a player may wager a stored benefit he or she has earned with respect to a merchant (e.g., coupons, frequent flyer miles, casino points, or WEBHOUSE® tokens). Similarly, a payout amount may represent something other than a monetary amount.

According to another embodiment, paper game tickets are provided to the player. For example, a player may use a kiosk located at a merchant's store to select various event parameters (e.g., a total wager amount and a total number of events). Based on the player-established event parameter or parameters, the kiosk prints out a set of paper to tickets to be played by the player.

According to one embodiment of the present invention, the total payout amount is immediately provided to player using the player's credit card number. In this case, the player may not be informed of the total payout amount until he or she completes the game session. According to another embodiment, the player must visit, for example, a merchant's store or an ATM device to receive payment of the total payout amount. According to one embodiment, player may be allowed to receive payment of event payout amounts as they are revealed (e.g., before he or she has finished a game session).

According to one embodiment, a player provides payment of a total wager amount before any event results are revealed. According to another embodiment, a player may first play a game session and later provide payment to the controller 300 (e.g., at the end of the day).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method of operating a lottery, the method comprising:

receiving an indication of a total wager amount;

receiving an indication of a total number of events, the total number of events being greater than one;

determining a per event wager amount based on the total wager amount;

determining a total payout based on the total wager amount;

outputting at least a first event result to a player, the first event result indicating at least one of win/loss and a portion of the total payout entitled to the player;

receiving a request for a modified number of events;

determining a remaining available wager;

determining a remainder of the total payout to be associated with the modified number of events, the remainder of the total payout being equal to the total payout less any portion of the total payout previously entitled to the player;

determining a modified per event wager amount based on (i) the modified number of events and (ii) the remaining available wager; and associating the modified per event wager amount with each of the modified total number of events.

2. A method of operating a lottery, the method comprising:

receiving an indication of a total wager amount;

receiving an indication of a total number of events, the total number of events being greater than one;

determining a per event wager amount based on the total number of events;

determining a total payout based on the total number of events;

outputting at least a first event result to a player, the first event result indicating at least one of win/loss and a portion of the total payout entitled to the player;

receiving a request for a modified number of events;

determining a remaining available wager;

determining a remainder of the total payout to be associated with the modified number of events, the remainder of the total payout being equal to the total payout less any portion of the total payout previously entitled to the player;

determining a modified per event wager amount based on (i) the modified number of events and (ii) the remaining available wager; and associating the modified per event wager amount with each of the modified total number of events.

3. A method of operating a lottery, the method comprising:

receiving an indication of a total wager amount;

receiving an indication of a total number of events, the total number of events being greater than one;

determining a per event wager amount based on the total wager amount;

determining a total payout based on the total number of events;

outputting at least a first event result to a player, the first event result indicating at least one of win/loss and a portion of the total payout entitled to the player;

receiving a request for a modified number of events;

determining a remaining available wager;

determining a remainder of the total payout to be associated with the modified number of events, the remainder of the total payout being equal to the total payout less any portion of the total payout previously entitled to the player;

determining a modified per event wager amount based on (i) the modified number of events and (ii) the remaining available wager; and associating the modified per event wager amount with each of the modified total number of events.

* * * * *